(12) United States Patent
Tomioka

(10) Patent No.: US 6,762,887 B2
(45) Date of Patent: Jul. 13, 2004

(54) WIDE-ANGLE ZOOM LENS

(75) Inventor: Ukyo Tomioka, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/382,524

(22) Filed: Mar. 7, 2003

(65) Prior Publication Data

US 2003/0184876 A1 Oct. 2, 2003

(30) Foreign Application Priority Data

Mar. 28, 2002 (JP) ........................................ 2002-091804

(51) Int. Cl.[7] .............................................. G02B 15/14
(52) U.S. Cl. ....................................... 359/691; 359/682
(58) Field of Search ......................... 359/691, 680–682, 359/686–688, 690, 676, 683

(56) References Cited

U.S. PATENT DOCUMENTS

| | | | | |
|---|---|---|---|---|
| 6,081,389 A | * | 6/2000 | Takayama et al. | 359/680 |
| 6,498,687 B1 | * | 12/2002 | Sekita et al. | 359/680 |
| 6,545,819 B1 | * | 4/2003 | Nanba et al. | 359/689 |
| 2001/0002866 A1 | * | 6/2001 | Wachi | 359/676 |
| 2001/0036020 A1 | | 11/2001 | Yamamoto | 359/676 |

FOREIGN PATENT DOCUMENTS

JP          7-35975          2/1995

* cited by examiner

*Primary Examiner*—Jordon M. Schwartz
(74) *Attorney, Agent, or Firm*—Arnold International; Bruce Y. Arnold

(57) ABSTRACT

A wide-angle zoom lens is formed of a first lens group having a negative refractive power, a stop, and a second lens group having a positive refractive power. Magnification is varied by moving the second lens group to the object side when zooming from the wide-angle end to the telephoto end. What would otherwise be a shift of the image plane with the zooming is corrected by moving the first lens group to the image side when zooming from the wide-angle end to the telephoto end. A lens in the second lens group has at least one surface that is aspherical and is positioned on the image side of a lens in the second lens group having positive refractive power and a convex surface on the object side.

1 Claim, 4 Drawing Sheets

Spherical Aberration (mm)

Astigmatism (mm)

Distortion

Spherical Aberration (mm)

Astigmatism (mm)

Distortion

Spherical Aberration (mm)

Astigmatism (mm)

Distortion

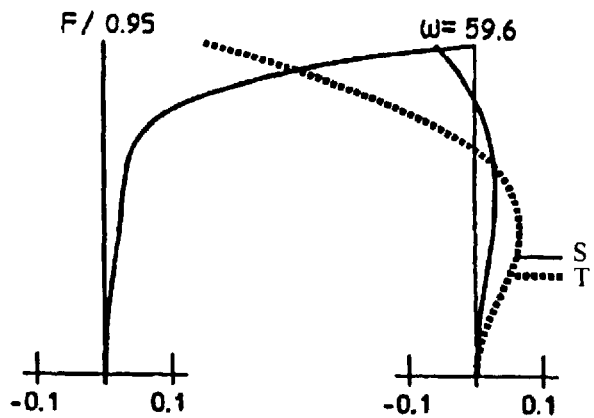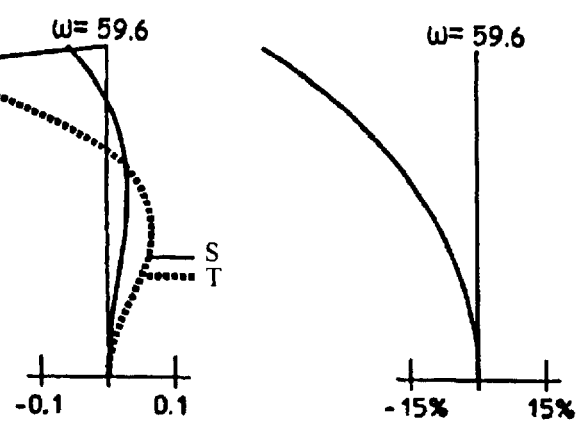
Spherical Aberration (mm)
Fig. 3A
Astigmatism (mm)
Fig. 3B
Distortion
Fig. 3C
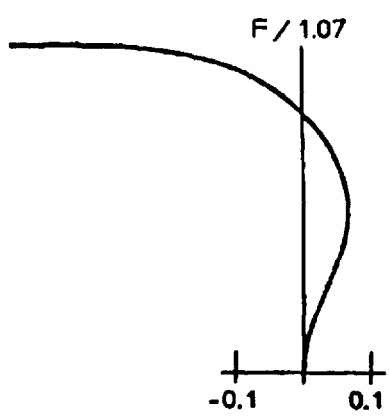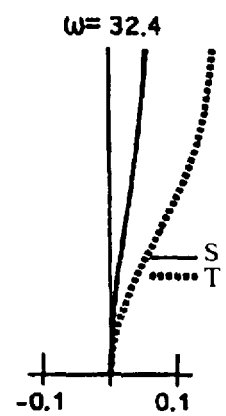
Spherical Aberration (mm)
Fig. 3D
Astigmatism (mm)
Fig. 3E
Distortion
Fig. 3F
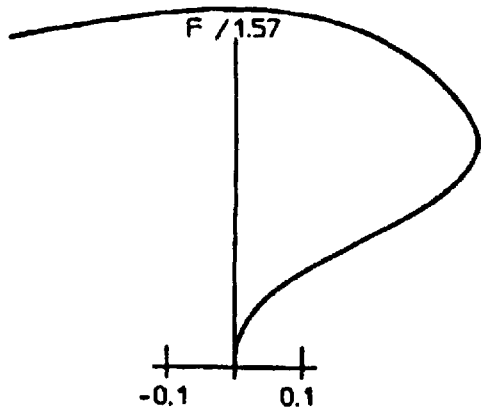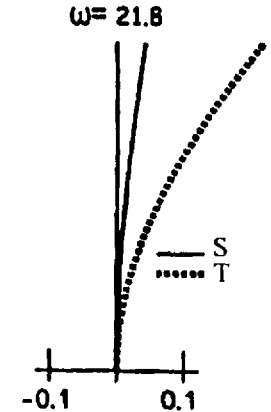
Spherical Aberration (mm)
Fig. 3G
Astigmatism (mm)
Fig. 3H
Distortion
Fig. 3I Spherical Aberration (mm)

Astigmatism (mm)

Distortion

Spherical Aberration (mm)

Astigmatism (mm)

Distortion

Spherical Aberration (mm)

Astigmatism (mm)

Distortion

WIDE-ANGLE ZOOM LENS

BACKGROUND OF THE INVENTION

Demand for monitoring cameras has recently increased as a result of commercial establishments such as banks, etc., establishing unmanned installations for providing service at night. Furthermore, in recent years there has arisen a demand for monitoring cameras having a zoom function. For a zoom lens of a monitoring camera, it is especially important that the lens be able to image objects in an environment of low illuminance and also that they have a wide-angle field of view. Furthermore, it has become increasingly desirable that the lens be compact and also provide good optical performance. A two-group zoom lens, as described in Japanese Laid-Open Patent Application H7-35975, for example, is applicable for such a zoom lens. The lens described in this publication is formed of two lens groups, of negative and positive refractive power, respectively, in order from the object side. Such a construction with a first lens group having a negative refractive power has the advantage of a wide angle of view and more easily provides a suitable back focus.

BRIEF SUMMARY OF THE INVENTION

The present invention relates to a wide-angle zoom lens with a field angle of about 120 degrees used in various video cameras or electronic still cameras, etc., with a CCD, and particularly to a small wide-angle zoom lens suitably used in a monitoring camera. In the zoom lens described in the above publication, the brightness at the wide-angle end is about F/2.0; however, an even brighter zoom lens with a brightness of F/1.0 at the wide-angle end has been required as a zoom lens for recent monitoring cameras. In the case of using, in order from the object side, a negative-positive, two lens group construction, if the lens system is to be made brighter it becomes more difficult to obtain good optical performance over the entire range of zooming due to the asymmetry of the wide-angle zoom lens construction, and this results in excessive fluctuation of aberrations.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 3A–3C show the spherical aberration, astigmatism, and distortion, respectively, of the wide-angle zoom lens according to Embodiment 2, at the wide-angle end;

FIGS. 3D–3F show the spherical aberration, astigmatism, and distortion, respectively, of the wide-angle zoom lens according to Embodiment 2, at a middle position;

FIGS. 3G–3I show the spherical aberration, astigmatism, and distortion, respectively, of the wide-angle zoom lens according to Embodiment 2, at the telescopic end;

DETAILED DESCRIPTION

Figure 1:
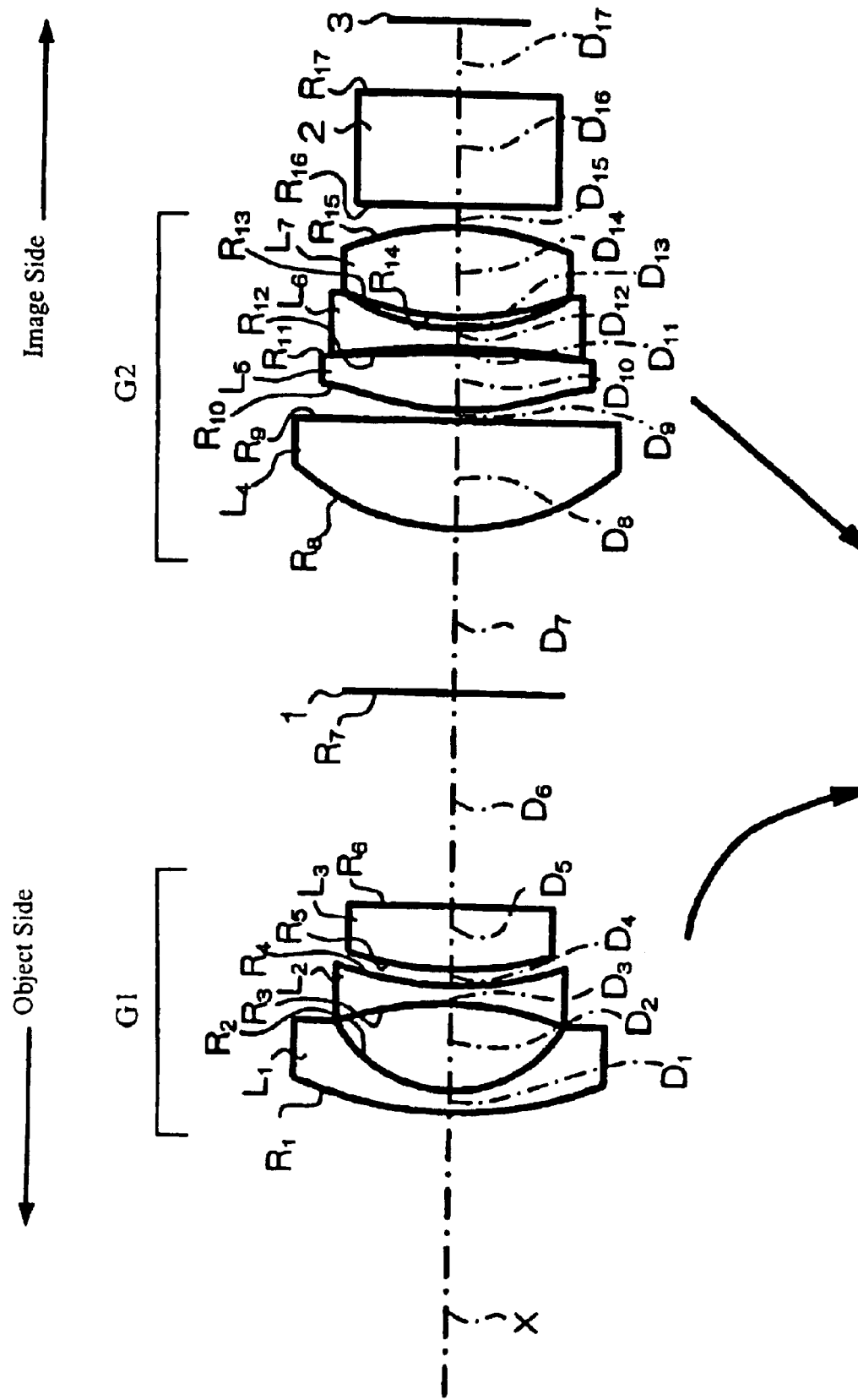
FIG. 1 shows the basic lens element configuration of a wide-angle zoom lens according to Embodiment 1.

The present invention provides a bright, wide-angle zoom lens that is usable at low light levels while maintaining good optical performance. The wide-angle zoom lens of this invention is characterized by arranging, in order from the object side, a first lens group having a negative refractive power, a stop, and a second lens group having a positive refractive power. Zooming is varied by moving the second lens group along the optical axis, and what would otherwise be a shifting of the image plane with the zooming operation is corrected by moving the first lens group to the image side when zooming from the wide-angle end to the telephoto end. A lens in the second lens group having at least one aspherical surface is positioned on the image side of a lens having positive refractive power and a convex surface on the object side.

Moreover, it is preferable that the lens having at least one surface that is aspherical be positioned immediately on the image side of a lens having positive refractive power and a convex surface on the object side.

Furthermore, it is preferable that the first lens group is formed of, in order from the object side, a first lens $L_1$ having negative refractive power and a concave surface on the image side, a second lens $L_2$ that is biconcave, and a third lens $L_3$ having positive refractive power and a convex surface on the object side. Also it is preferable that the second lens group is formed of, in order from the object side, a fourth lens $L_4$ having positive refractive power and a convex surface on the object side, a fifth lens $L_5$ having positive refractive power and at least one surface that is aspherical, a sixth lens $L_6$ that is biconcave, and a seventh lens $L_7$ that is biconvex.

The present invention will first be discussed in general terms, with reference to FIG. 1 which, though specifically illustrating the first embodiment of the invention, also is representative of the invention in general. The wide-angle zoom lens of the present invention has a compact construction and uses a total of 7 lenses in two lens groups. The first lens group G1 has negative refractive power and is formed of three lenses. The second lens group G2 has overall positive refractive power and is formed of four lenses. A stop 1 is arranged between the first lens group and the second lens group, and a filter 2, such as an infrared-blocking filter, etc., may be arranged on the image side of the second lens group. Light incident from the object side of the zoom lens is imaged at an image pickup plane 3 of a solid-state image pickup element (CCD) that is positioned along the optical axis X.

The first lens group G1 and the second lens group G2 are moved along the optical axis X during zooming. As shown by arrow lines of FIG. 1, when zooming from the wide-angle end to the telephoto end, magnification is varied by moving the second lens group along the optical axis toward the object side and what would otherwise be a shifting of the image plane with zooming is corrected by moving the first lens group to the image side when zooming from the wide-angle end to the telephoto end.

Focusing is performed by moving the first lens group G1 along the optical axis X.

As shown in FIG. 1, the first lens group G1 is formed of, in order from the object side, a first lens $L_1$ of negative refractive power having a meniscus shape with its convex surface on the object side, a biconcave second lens $L_2$, and a third lens $L_3$ of positive refractive power and a meniscus shape with its convex surface on the object side.

The second lens group G2 is formed of, in order from the object side, a fourth lens $L_4$ having a positive refractive power and a convex surface on the object side, a biconvex fifth lens $L_5$ both surfaces of which are aspherical, a biconcave sixth lens $L_6$, and a biconvex seventh lens $L_7$.

The fifth lens $L_5$ and the sixth lens $L_6$ each consist of a single lens element. These lenses are separated by a small air spacing and, by making these two lenses of materials having a difference in Abbe numbers greater than a prescribed value (e.g., 30 or above), excellent correction of chromatic aberrations is achieved.

In the wide-angle zoom lens of the invention, a bright image is provided by making the fourth lens $L_4$ so that it has strong positive refractive power and a larger aperture diameter. Excessive aberrations at the periphery of the lens can be corrected by employing an aspherical surface on the fourth lens $L_4$ and/or one or more aspherical surfaces on the fifth lens $L_5$. Those surfaces that are aspherical satisfy the following equation:

$$Z = [(CY^2)/\{1+(1-K \cdot C^2 Y^2)^{1/2}\}] + A_4 Y^4 + A_6 Y^6 + A_8 Y^8 + A_{10} Y^{10} \quad \text{(Equation A)}$$

where

Z is the length (in mm) of a line drawn from a point on the aspheric lens surface at a distance Y from the optical axis to the tangential plane of the aspherical surface vertex, C is the curvature (=1/R) of the aspheric lens surface near the optical axis, Y is the distance (in mm) from the optical axis, K is the eccentricity, and $A_4$, $A_6$, $A_8$, and $A_{10}$ are the 4th, 6th, 8th, and 10th aspherical coefficients.

In this manner, good optical performance can be maintained and a bright image provided.

It is preferable that the following Condition (1) is satisfied:

$$2.0 < R_8/fw < 5.0 \quad \text{Condition (1)}$$

where $R_8$ is the radius of curvature of the object-side surface of the fourth lens element, and fw is the focal length of the zoom lens at the wide-angle end.

Several embodiments of the wide-angle zoom lens of the invention will now be discussed in detail.

Embodiment 1

As mentioned previously, this embodiment, as well as each embodiment, is well-illustrated by FIG. 1.

Table 1 below lists the surface number #, in order from the object side, the radius of curvature R (in mm) of each surface near the optical axis, the on-axis surface spacing D (in mm) between surfaces, as well as the refractive index $N_e$ and the Abbe number $v_e$ (both at the e-line, λ=587.6 nm) of each lens element for Embodiment 1.

TABLE 1

| # | R | D | $N_e$ | $v_e$ |
|---|---|---|---|---|
| 1 | 17.735 | 1.00 | 1.83932 | 36.9 |
| 2 | 5.948 | 3.95 | | |
| 3 | −15.318 | 0.80 | 1.74678 | 49.1 |
| 4 | 15.318 | 0.75 | | |
| 5 | 15.689 | 2.92 | 1.85504 | 23.6 |
| 6 | ∞ | $D_6$ (variable) | | |
| 7 (stop) | ∞ | $D_7$ (variable) | | |
| 8 | 10.978 | 4.90 | 1.73234 | 54.4 |
| 9 | ∞ | 0.53 | | |
| 10* | 12.340 | 2.66 | 1.57486 | 57.5 |
| 11* | −32.792 | 0.19 | | |
| 12 | −40.095 | 0.86 | 1.85504 | 23.6 |
| 13 | 9.395 | 0.56 | | |
| 14 | 13.270 | 4.03 | 1.71615 | 53.6 |
| 15 | −13.270 | 1.00 | | |
| 16 | ∞ | 5.00 | 1.51825 | 63.9 |
| 17 | ∞ | | | |

Those lens surfaces with a * to the right of the surface number in Table 1 are aspherical, and the aspheric surface shape of these lens elements is expressed by Equation (A) above.

Table 2 below lists the values of the constants K, $A_4$, $A_6$, $A_8$, and $A_{10}$ used in Equation (A) above for each of the aspherical surfaces indicated in Table 1. An "E" in the data indicates that the number following the "E" is the exponent to the base 10. For example, "1.0E-02" represents the number $1.0 \times 10^{-2}$.

TABLE 2

| # | K | $A_4$ | $A_6$ | $A_8$ | $A_{10}$ |
|---|---|---|---|---|---|
| 10 | 2.3710183 | −3.372856E−4 | 5.229652E−6 | −4.895832E−7 | 5.138015E−9 |
| 11 | −122.0702273 | 3.418267E−5 | 8.673640E−6 | −4.641317E−7 | 5.677795E−9 |

Table 3 below lists, for various zoom ratios (namely, the wide-angle end having a zoom ratio of x1.0, an intermediate position having a zoom ratio of x1.75, and the telephoto end having a zoom ratio of x2.6), the values of the variable spacings $D_6$ and $D_7$, as well as the focal length (in mm), the f-number $F_{NO}$, and the image angle 2ω (in degrees).

TABLE 3

| Zoom ratio | $D_6$ | $D_7$ | f | $F_{NO}$ | 2ω |
|---|---|---|---|---|---|
| x1.0 | 9.942 | 7.540 | 3.05 | 0.98 | 118.8 |
| x1.75 | 2.642 | 4.289 | 5.33 | 1.27 | 64.9 |
| x2.6 | 1.725 | 0.624 | 7.90 | 1.70 | 43.6 |

Figure 2A:
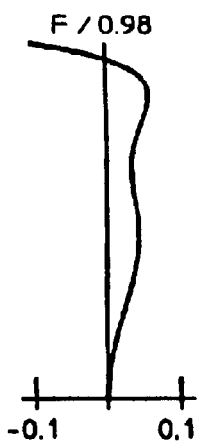
FIGS. 2A–2C show the spherical aberration, astigmatism, and distortion, respectively, of the wide-angle zoom lens according to Embodiment 1, at the wide-angle end.
Figure 2B:
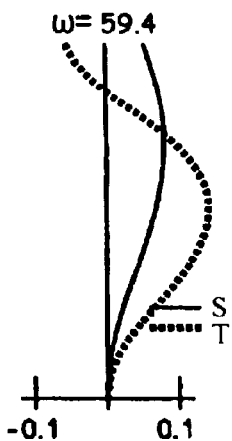
Figure 2C:
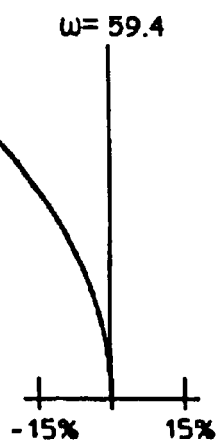
Figure 2D:
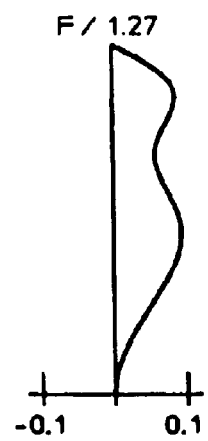
FIGS. 2D–2F show the spherical aberration, astigmatism, and distortion, respectively, of the wide-angle zoom lens according to Embodiment 1, at a middle position.
Figure 2E:
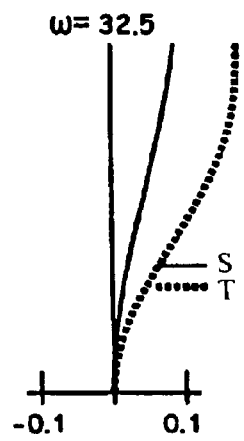
Figure 2F:
Figure 2G:
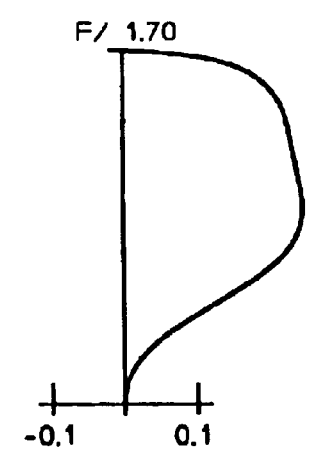
FIGS. 2G–2I show the spherical aberration, astigmatism, and distortion, respectively, of the wide-angle zoom lens according to Embodiment 1, at the telescopic end.
Figure 2H:
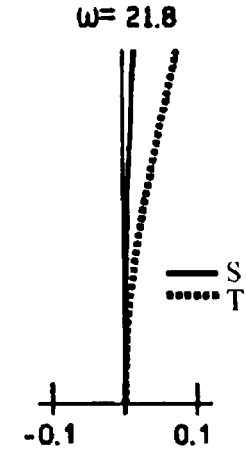
Figure 2I:

FIGS. 2A–2C show the spherical aberration (in mm), astigmatism (in mm), and distortion, respectively, at the wide-angle end (f=3.05 mm, zoom ratio x1.0), FIGS. 2D–2F show these same aberrations at a middle position (f=5.33 mm, zoom ratio x1.75), and FIGS. 2G–2I show these same aberrations at the telephoto end (f=7.90 mm, zoom ratio x2.6). In these figures ω is the half-image angle, and the astigmatism is shown for both the sagittal image plane S and the tangential image plane T.

As is apparent from these figures, in this embodiment the half-image angle varies when zooming from the wide-angle end to the telephoto end, from 59.4° to 21.8°, the $F_{NO}$ varies between 0.98 and 1.70, and the various aberrations are favorably corrected. Also, this embodiment satisfies Condition (1), since $R_8$/fw equals 3.6.

Embodiment 2

Embodiment 2 has the same basic lens element configuration as that of Embodiment 1.

Table 4 below lists the surface number #, in order from the object side, the radius of curvature R (in mm) of each surface near the optical axis, the on-axis surface spacing D (in mm) between surfaces, as well as the refractive index $N_e$ and the Abbe number $v_e$ (both at the e-line, λ=546.1 nm) of each lens element for Embodiment 2.

TABLE 4

| # | R | D | $N_e$ | $v_e$ |
|---|---|---|---|---|
| 1 | 17.707 | 1.21 | 1.83932 | 36.9 |
| 2 | 5.950 | 3.68 | | |
| 3 | −15.334 | 0.65 | 1.74678 | 49.1 |
| 4 | 15.334 | 0.52 | | |
| 5 | 15.668 | 2.78 | 1.85504 | 23.6 |
| 6 | ∞ | $D_6$ (variable) | | |
| 7 (stop) | ∞ | $D_7$ (variable) | | |
| 8 | 9.501 | 5.01 | 1.73234 | 54.4 |
| 9* | ∞ | 0.71 | | |
| 10* | 12.352 | 2.75 | 1.57486 | 57.5 |
| 11* | −32.863 | 0.26 | | |
| 12 | −39.943 | 0.95 | 1.85504 | 23.6 |
| 13 | 9.387 | 0.70 | | |
| 14 | 13.284 | 4.16 | 1.71615 | 53.6 |
| 15 | −13.283 | 1.00 | | |
| 16 | ∞ | 5.00 | 1.51825 | 63.9 |
| 17 | ∞ | | | |

Those lens surfaces with a * to the right of the surface number in Table 4 are aspherical, and the aspheric shape surface of these lens elements is expressed by Equation (A) above.

Table 5 below lists the values of the constants K, $A_4$, $A_6$, $A_8$, and $A_{10}$ used in Equation (A) above for each of the aspherical surfaces indicated in Table 4. An "E" in the data indicates that the number following the "E" is the exponent to the base 10. For example, "1.0E-02" represents the number $1.0 \times 10^{-2}$.

TABLE 5

| # | K | $A_4$ | $A_6$ | $A_8$ | $A_{10}$ |
|---|---|---|---|---|---|
| 9 | 1.0 | 3.194945E−5 | 7.946141E−8 | −2.655378E−9 | −8.293605E−13 |
| 10 | 2.3923914 | −3.782920E−4 | 3.873569E−6 | −4.943592E−7 | 5.139627E−9 |
| 11 | −122.0699077 | 1.827596E−4 | 1.136667E−5 | −4.404290E−7 | 5.679432E−9 |

Table 6 below lists, for various zoom ratios (namely, the wide-angle end having a zoom ratio of x1.0, an intermediate position having a zoom ratio of x1.75, and the telephoto end having a zoom ratio of x2.6), the values of the variable spacings $D_6$ and $D_7$, as well as the focal length (in mm), the f-number $F_{NO}$, and the image angle 2ω (in degrees).

TABLE 6

| Zoom ratio | $D_6$ | $D_7$ | f | $F_{NO}$ | 2ω |
|---|---|---|---|---|---|
| x1.0 | 9.688 | 7.282 | 3.05 | 0.95 | 119.1 |
| x1.75 | 2.646 | 4.117 | 5.33 | 1.07 | 64.7 |
| x2.6 | 1.781 | 0.548 | 7.90 | 1.57 | 43.5 |

FIGS. 3A–3C show the spherical aberration (in mm), astigmatism (in mm), and distortion, respectively, at the wide-angle end (f=3.05 mm, zoom ratio=x1.0), FIGS. 3D–3F show these same aberrations at a middle position (f=5.33 mm, zoom ratio =x1.75), and FIGS. 3G–3I show these same aberrations at the telephoto end (f=7.90 mm, zoom ratio=x2.6). In these figures ω is the half-image angle, and the astigmatism is shown for both the sagittal image plane S and the tangential image plane T.

As is apparent from this figures, in this embodiment the half-image angle varies, when zooming from the wide-angle end to the telephoto end, from 59.6° to 21.8°, and the $F_{NO}$ varies between 0.95 and 1.57, and the various aberrations are favorably corrected. Also, this embodiment satisfies Condition (1), since $R_8$/fw equals 3.1.

Embodiment 3

Embodiment 3 has the same basic lens element configuration as that of Embodiment 1.

Table 7 below lists the surface number #, in order from the object side, the radius of curvature R (in mm) of each surface near the optical axis, the on-axis surface spacing D (in mm) between surfaces, as well as the refractive index $N_e$ and the Abbe number $v_e$ (both at the e-line, λ=546.1 nm) of each lens element for Embodiment 3.

TABLE 7

| # | R | D | $N_e$ | $v_e$ |
|---|---|---|---|---|
| 1 | 17.753 | 0.87 | 1.83932 | 36.9 |
| 2 | 5.946 | 4.12 | | |
| 3 | −15.309 | 0.90 | 1.74678 | 49.1 |
| 4 | 15.308 | 0.91 | | |
| 5 | 15.702 | 3.01 | 1.85504 | 23.6 |
| 6 | ∞ | $D_6$ (variable) | | |
| 7 (stop) | ∞ | $D_7$ (variable) | | |
| 8 | 11.999 | 4.85 | 1.73234 | 54.4 |
| 9* | ∞ | 0.43 | | |
| 10* | 12.332 | 2.60 | 1.57486 | 57.5 |
| 11* | −32.740 | 0.15 | | |
| 12 | −40.208 | 0.81 | 1.85504 | 23.6 |
| 13 | 9.401 | 0.54 | | |

TABLE 7-continued

| # | R | D | $N_e$ | $v_e$ |
|---|---|---|---|---|
| 14 | 13.259 | 3.96 | 1.71615 | 53.6 |
| 15 | −13.259 | 1.00 | | |
| 16 | ∞ | 5.00 | 1.51825 | 63.9 |
| 17 | ∞ | | | |

Those lens surfaces with a * to the right of the surface number in Table 7 are aspherical, and the aspheric surface shape of these lens elements is expressed by Equation (A) above.

Table 8 below lists the values of the constants $K$, $A_4$, $A_6$, $A_8$, and $A_{10}$ used in Equation (A) above for each of the aspherical surfaces indicated in Table 7. An "E" in the data indicates that the number following the "E" is the exponent to the base 10. For example, "1.0E-02" represents the number $1.0 \times 10^{-2}$.

TABLE 8

| # | K | $A_4$ | $A_6$ | $A_8$ | $A_{10}$ |
|---|---|---|---|---|---|
| 9 | 1.0 | −3.595589E−5 | −1.817728E−8 | 1.016315E−8 | 4.301033E−12 |
| 10 | 2.3710183 | −3.744645E−4 | 5.078833E−6 | −4.936176E−7 | 5.136866E−9 |
| 11 | −122.0703588 | −3.960936E−5 | 7.247353E−6 | −4.811472E−7 | 5.676360E−9 |

Table 9 below lists, for various zoom ratios (namely, the wide-angle end having a zoom ratio of x1.0, an intermediate position having a zoom ratio of x1.75, and the telephoto end having a zoom ratio of x2.6), the values of the variable spacings $D_6$ and $D_7$, as well as the focal length (in mm), the f-number $F_{NO}$, and the image angle 2ω (in degrees).

TABLE 9

| Zoom ratio | $D_6$ | $D_7$ | f | $F_{NO}$ | 2ω |
|---|---|---|---|---|---|
| x1.0 | 10.103 | 7.700 | 3.05 | 1.02 | 118.1 |
| x1.75 | 2.587 | 4.387 | 5.33 | 1.36 | 65.0 |
| x2.6 | 1.620 | 0.651 | 7.90 | 1.76 | 43.6 |

Figure 4A:
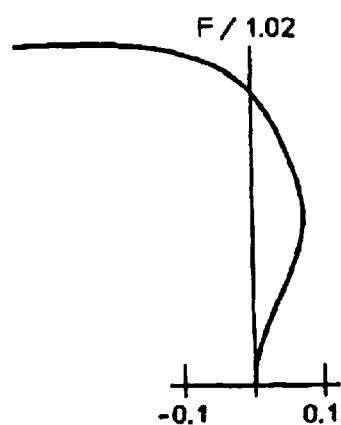
FIGS. 4A–4C show the spherical aberration, astigmatism, and distortion, respectively, of the wide-angle zoom lens according to Embodiment 3, at the wide-angle end.
Figure 4B:
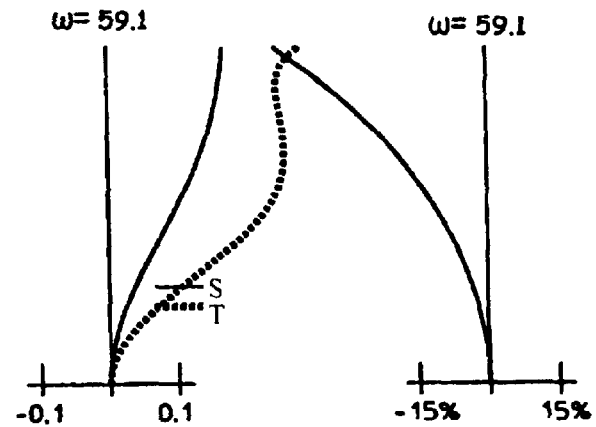
Figure 4C:
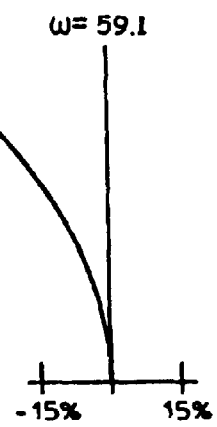
Figure 4D:
FIGS. 4D–4F show the spherical aberration, astigmatism, and distortion, respectively, of the wide-angle zoom lens according to Embodiment 3, at a middle position.
Figure 4E:
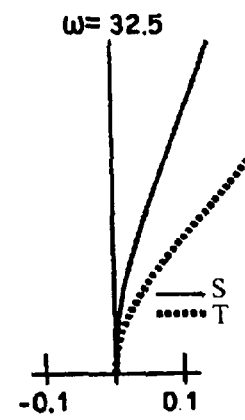
Figure 4F:
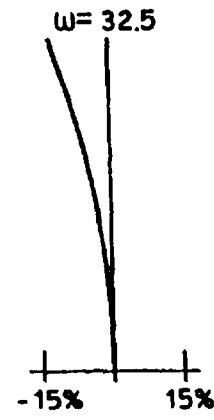
Figure 4G:
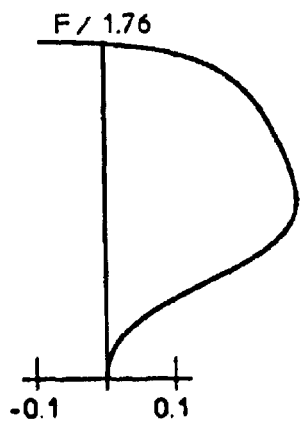
FIGS. 4G–4I show the spherical aberration, astigmatism, and distortion, respectively, of the wide-angle zoom lens according to Embodiment 3, at the telescopic end.
Figure 4H:
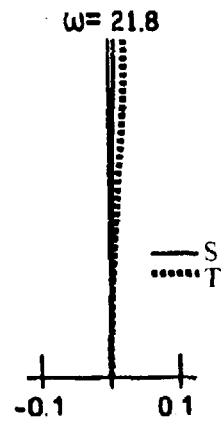
Figure 4I:

FIGS. 4A–4C show the spherical aberration (in mm), astigmatism (in mm), and distortion, respectively, at the wide-angle end (f=3.05 mm, zoom ratio =x1.0), FIGS. 4D–4F show these same aberrations at a middle position (f=5.33 mm, zoom ratio =x1.75), and FIGS. 4G–4I show these same aberrations at the telephoto end (f==7.90 mm, zoom ratio =x2.6). In these figures ω is the half-image angle, and the astigmatism is shown for both the sagittal image plane S and the tangential image plane T.

As is apparent from this figures, in this embodiment the half-image angle varies, when zooming from the wide-angle end to the telephoto end, from 59.1° to 21.8°, the $F_{NO}$ varies from 1.02 and 1.76, and the various aberrations are favorably corrected. Also, this embodiment satisfies Condition (1), since $R_8$/fw equals 3.9.

The invention being thus described, it will be obvious that the same may be varied in many ways. For example, the specific details given in the construction of the lenses in the preferred embodiments may be varied as to the number of lens elements, the radii of curvature, the on-axis spacings between lenses, and the materials used. For example, the materials of the aspheric lens components need not be glass, as these components can be made of plastic so as to reduce manufacturing costs. Alternatively, a plastic aspherical film or coating can be applied to a lens element in order to create a composite aspherical lens, as is known in the art. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A wide-angle zoom lens comprising, in order from the object side:

a first lens group having a negative refractive power;

a stop; and a second lens group having a positive refractive power; wherein magnification is varied by moving the second lens group to the object side when zooming from the wide-angle end to the telephoto end;

what would otherwise be a shift of the image plane with the zooming is corrected by moving the first lens group to the image side when zooming from the wide-angle end to the telephoto end;

a lens in the second lens group has at least one surface that is aspherical, said lens being positioned on the image side of a lens in the second lens group having positive refractive power and a convex surface the object side;

no lens element intervenes between the lens in the second lens group having positive refractive power with a convex surface on the object side and the lens in the second lens group having at least one surface that is aspherical;

the first lens group comprising, in order from the object side, a first lens having negative refractive power and a concave surface on the image side, a second lens that is biconcave, and a third lens having positive refractive power with a convex surface on the object side; and the second lens group comprising, in sequential order from the object side, a fourth lens having positive refractive power and a convex surface on the object side, a fifth lens having positive refractive power and at least one surface that is aspherical, a sixth lens that is biconcave, and a seventh lens that is biconvex.

* * * * *

UNITED STATES PATENT AND TRADEMARK OFFICE
CERTIFICATE OF CORRECTION

PATENT NO. : 6,762,887 B2
DATED : July 13, 2004
INVENTOR(S) : Tomioka

It is certified that error appears in the above-identified patent and that said Letters Patent is hereby corrected as shown below:

Column 7,
Line 51, change "end (f = = 7.90 mm," to -- end (f = 7.90 mm, --.

Signed and Sealed this

Twenty-first Day of December, 2004

JON W. DUDAS
*Director of the United States Patent and Trademark Office*